United States Patent
Park et al.

(10) Patent No.: US 8,372,560 B2
(45) Date of Patent: Feb. 12, 2013

(54) SEPARATOR FOR FUEL CELL

(75) Inventors: Sun Soon Park, Gyeonggi-do (KR); Seong Pil Ryu, Gyeonggi-do (KR); Hee Seok Jeong, Seoul (KR); Sang Uk Kwon, Gyeonggi-do (KR); Nam Woo Lee, Gyeonggi-do (KR); Seo Ho Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 960 days.

(21) Appl. No.: 12/368,550

(22) Filed: Feb. 10, 2009

(65) Prior Publication Data

US 2010/0104921 A1 Apr. 29, 2010

(30) Foreign Application Priority Data

Oct. 29, 2008 (KR) .................. 10-2008-0106443

(51) Int. Cl.
*H01M 8/04* (2006.01)
*H01M 2/08* (2006.01)
*H01M 2/14* (2006.01)

(52) U.S. Cl. .................. 429/514; 429/508; 429/512

(58) Field of Classification Search .................. None
See application file for complete search history.

(56) References Cited

U.S. PATENT DOCUMENTS

| 7,935,452 B2 * | 5/2011 | Kaye ........................ 429/460 |
| 2004/0058218 A1 * | 3/2004 | Atbi et al. .................. 429/34 |
| 2008/0113241 A1 | 5/2008 | Berning | |

FOREIGN PATENT DOCUMENTS

| JP | 2002-343382 | 11/2002 |
| JP | 2005-310586 | 11/2005 |
| JP | 2006-049177 | 2/2006 |
| JP | 2007-103241 | 4/2007 |
| JP | 2008-198393 | 8/2008 |
| KR | 10-2007-0091386 | 9/2007 |

* cited by examiner

*Primary Examiner* — Milton I Cano
*Assistant Examiner* — Sarah A Slifka
(74) *Attorney, Agent, or Firm* — Edwards Wildman Palmer LLP; Peter F. Corless

(57) ABSTRACT

The present invention provides a separator for a fuel cell, in which a water discharge hole such as a venturi tube or a water discharge means including a metal plate for condensing water is provided on a land of the separator being in contact with a gas diffusion layer (GDL) of a fuel cell so that water generated by a reaction is easily discharged from the GDL through the water discharge means.

5 Claims, 11 Drawing Sheets

SEPARATOR FOR FUEL CELL

CROSS-REFERENCE TO RELATED APPLICATION

This application claims under 35 U.S.C. §119(a) the benefit of Korean Patent Application No. 10-2008-0106443 filed Oct. 29, 2008, the entire contents of which are incorporated herein by reference.

BACKGROUND (a) Technical Field

The present disclosure relates to a separator for a fuel cell. More particularly, it relates to a separator for a fuel cell, in which a water discharge hole such as a venturi tube or a water discharge means including a metal plate for condensing water is provided on a land of the separator being in contact with a gas diffusion layer (GDL) of a fuel cell so that water generated by a reaction is easily discharged from the GDL through the water discharge means.

(b) Background Art

Generally, a polymer electrolyte fuel cell has some advantages such as higher efficiency, greater current density and output density, and shorter starting time, as compared to other types of fuel cells. Further, since a polymer electrolyte fuel cell employs a solid electrolyte, it is also free from corrosion and does not need to regulate the electrolyte. As the polymer electrolyte fuel cell is an environment-friendly power source that exhausts pure water, it is of interest to the automotive industry.

The structure of an exemplary fuel cell stack will be described with reference to FIG. 1. A membrane electrode assembly (MEA) is positioned in the center of each unit cell of the fuel cell stack. Preferably, the MEA comprises a polymer electrolyte membrane 10, through which hydrogen ions (protons) are transported, and catalyst layers including a cathode (air electrode) 12 and an anode (fuel electrode) 14, which are coated on both sides of the electrolyte membrane 10 so that hydrogen reacts with oxygen.

Preferably, a gas diffusion layer (GDL) 16 and a gasket 18 are sequentially stacked on the outside of the electrolyte membrane 10, i.e., on the outside where the cathode 12 and the anode 14 are respectively positioned. A separator (also called a bipolar plate) 20 including a flow field, through which reactant gases are suitably supplied and water generated by a reaction is suitably discharged, is preferably positioned on the outside of the GDL 16. In certain exemplary embodiments, an end plate 30 for supporting and fixing the above-described elements is suitably connected to the outermost surface.

As an oxidation reaction of hydrogen takes place at the anode 14 of the fuel cell stack, hydrogen ions (protons) and electrons are produced. Accordingly, the thus produced hydrogen ions and electrons are suitably transmitted to the cathode 12 through the electrolyte membrane 10 and the separator 20, respectively. At the cathode 12, the hydrogen ions and electrons transmitted from the anode 14 react with oxygen in the air supplied to the cathode 12 to produce water by an electrochemical reaction. Preferably, the electrical energy generated from the flow of electrons is suitably supplied to a load that requires electrical energy through a current collector plate (not shown) of the end plate 30.

In certain embodiments, and as can be seen from FIG. 2 showing the unit cell of the fuel cell stack that generates electrical energy based on the above structure, the separator 20 comprises a plurality of lands 32, which is a flat portion directly bonded to the GDL 16, and a plurality of flow fields (or channels) 34 formed between the respective lands 32, through which hydrogen or air passes. Further, the separator 20 serves as a path through which water generated at the cathode 12 is removed and functions to transmit generated electricity to the outside.

Generally, most conventional separators comprise a plurality of lands and a plurality of flow fields having a suitably concave convex shape. As shown in FIG. 3, the flow field preferably includes a linear flow field 36 and a serpentine flow field 38 suitably modified from the linear flow field. The serpentine flow field 38 has an advantage in that hydrogen and air collide with the wall surface of the corresponding flow field to change the movement direction, which facilitates the diffusion of hydrogen and air into the GDL 16, thereby considerably improving electricity generation.

As shown in FIG. 4, a large amount of water generated by a reaction at the cathode 12 is discharged from the GDL 16 through the flow fields 34 of the separator 20; however, air is supplied from the flow fields 34 of the separator 20 and diffused into the GDL 16. Accordingly, the flow of discharged water collides with the flow of diffused air, and thus the water and air flow suitably interfere with each other.

As a result, the water discharge flow is obstructed by the air flow, and thus the water discharge efficiency is suitably deteriorated; further, the air flow is obstructed by the water discharge flow, and thus the efficiency that the air is diffused into the GDL is suitably deteriorated.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a separator for a fuel cell, in which a plurality of water discharge holes such as a venturi tube are preferably provided between a plurality of lands of the separator being in contact with and bonded to a gas diffusion layer (GDL) of a fuel cell and a plurality of flow fields formed between the respective lands, through which hydrogen or air passes, so that water generated by a reaction is easily discharged from the GDL through the water discharge holes and, at the same time, air supplied to the flow fields of the separator is easily diffused into the GDL.

In one embodiment, the present invention provides a separator for a fuel cell preferably comprising: a plurality of lands being in contact with and bonded to a gas diffusion layer of a fuel cell; and a plurality of flow fields formed between the respective lands, through which hydrogen or air passes, wherein a plurality of water discharge means is suitably formed between the lands and the flow fields so that water is easily discharged from the gas diffusion layer to the flow fields.

In one preferred embodiment, the plurality of water discharge means preferably comprises a plurality of water discharge holes having a venturi effect, formed to penetrate between the lands and the flow fields.

In another preferred embodiment, the plurality of water discharge holes preferably penetrates in a perpendicular path or an inclined path.

In still another preferred embodiment, the plurality of water discharge holes having an inclined path is preferably formed at an angle of 45° with respect to the flow direction of air supplied to the flow field and the surface of the land.

In yet another preferred embodiment, a porous material having microporosity is suitably filled in the plurality of water discharge holes.

In still yet another preferred embodiment, each of the water discharge means preferably comprises a thermally conductive metal plate inserted into the land from the surface thereof.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
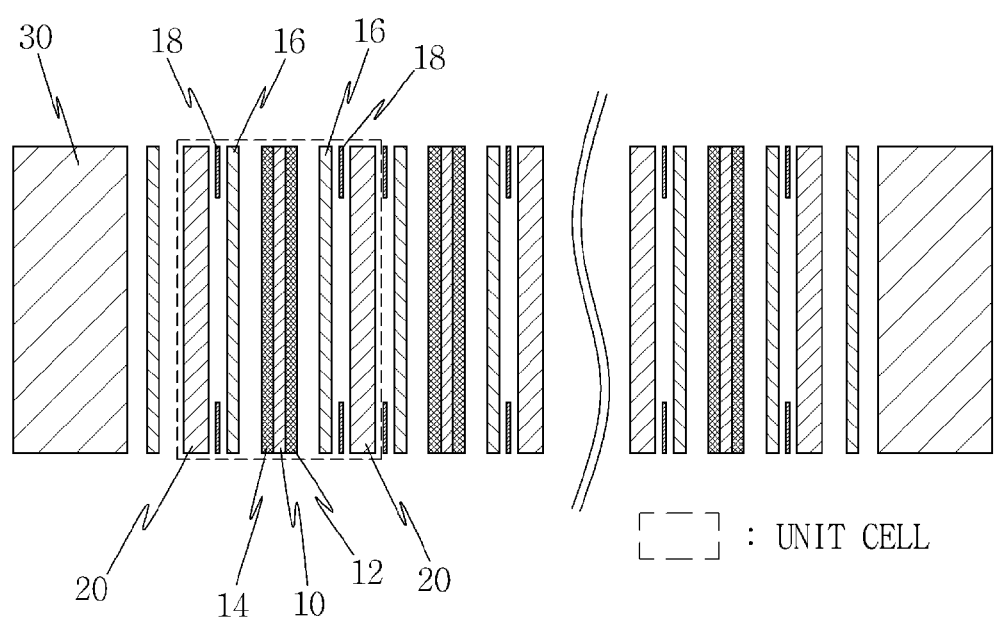
FIG. 1 is a schematic diagram illustrating a configuration of a fuel cell.
Figure 2:
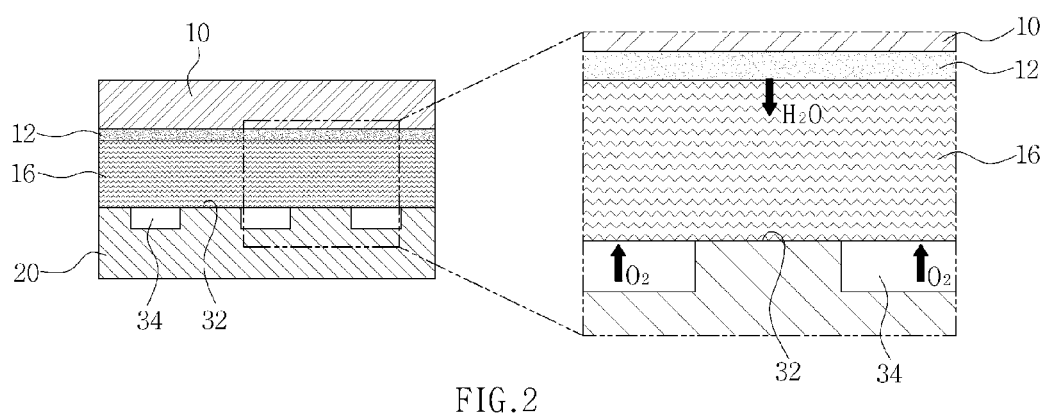
FIG. 2 is a cross-sectional view illustrating a unit cell of a fuel cell, in which the structure of a land and a flow field of a separator is shown.
Figure 3:
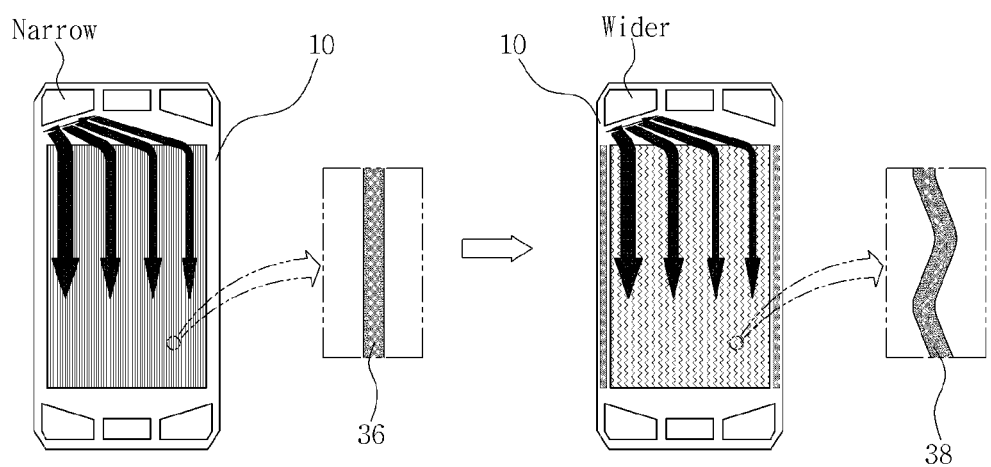
FIG. 3 is a plan view illustrating a structure of a conventional separator flow field.
Figure 4:
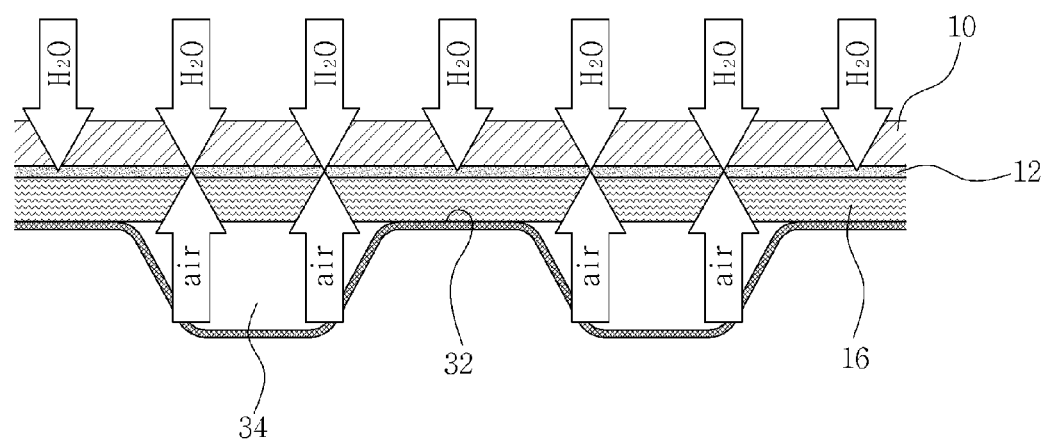
FIG. 4 is a cross-sectional view illustrating problems caused in a conventional separator.

Reference numerals set forth in the Drawings includes reference to the following elements as further discussed below:

| | |
|---|---|
| 10: polymer electrolyte membrane | 12: cathode |
| 14: anode | 16: gas diffusion layer |
| 18: gasket | 20: separator |
| 30: end plate | 32: land |
| 34: flow field | 36: linear flow field |
| 38: serpentine flow field | 40: water discharge hole |
| 42: porous material | 44: thermally conductive metal plate |
| 50: metal separator | 52: groove |
| 54: sealing means | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes a separator for a fuel cell comprising a plurality of lands and a plurality of flow fields formed between the respective lands, through which hydrogen or air passes a plurality of water discharge means.

In one embodiment, the plurality of lands are in contact with and bonded to a gas diffusion layer of a fuel cell.

In another embodiment, the plurality of water discharge means is formed between the lands and the flow fields.

In another embodiment, water is easily discharged from the gas diffusion layer to the flow fields from the plurality of water discharge means that is formed between the lands and the flow fields.

In still a further embodiment, the plurality of water discharge means comprises a plurality of water discharge holes having a venturi effect, formed to penetrate between the lands and the flow fields.

In another aspect, the invention features a metal separator for a fuel cell comprising a plurality of lands and a plurality of flow fields formed between the respective lands, through which hydrogen or air passes wherein a plurality of grooves connected to the flow fields is formed on the lands of the metal separator.

In one embodiment, the plurality of lands are in contact with and bonded to a gas diffusion layer of a fuel cell.

In another embodiment, the lands and the flow fields having a concave convex shape.

In still another embodiment, an opened portion of each of the grooves of the plurality of grooves is sealed with a sealing means to form a water discharge hole connecting the land and the flow field.

The invention also features a motor vehicle comprising the separator for a fuel cell as described in any of the aspects or embodiments herein.

The invention also features a motor vehicle comprising the metal separator for a fuel cell as described in any of the aspects or embodiments herein.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 5:
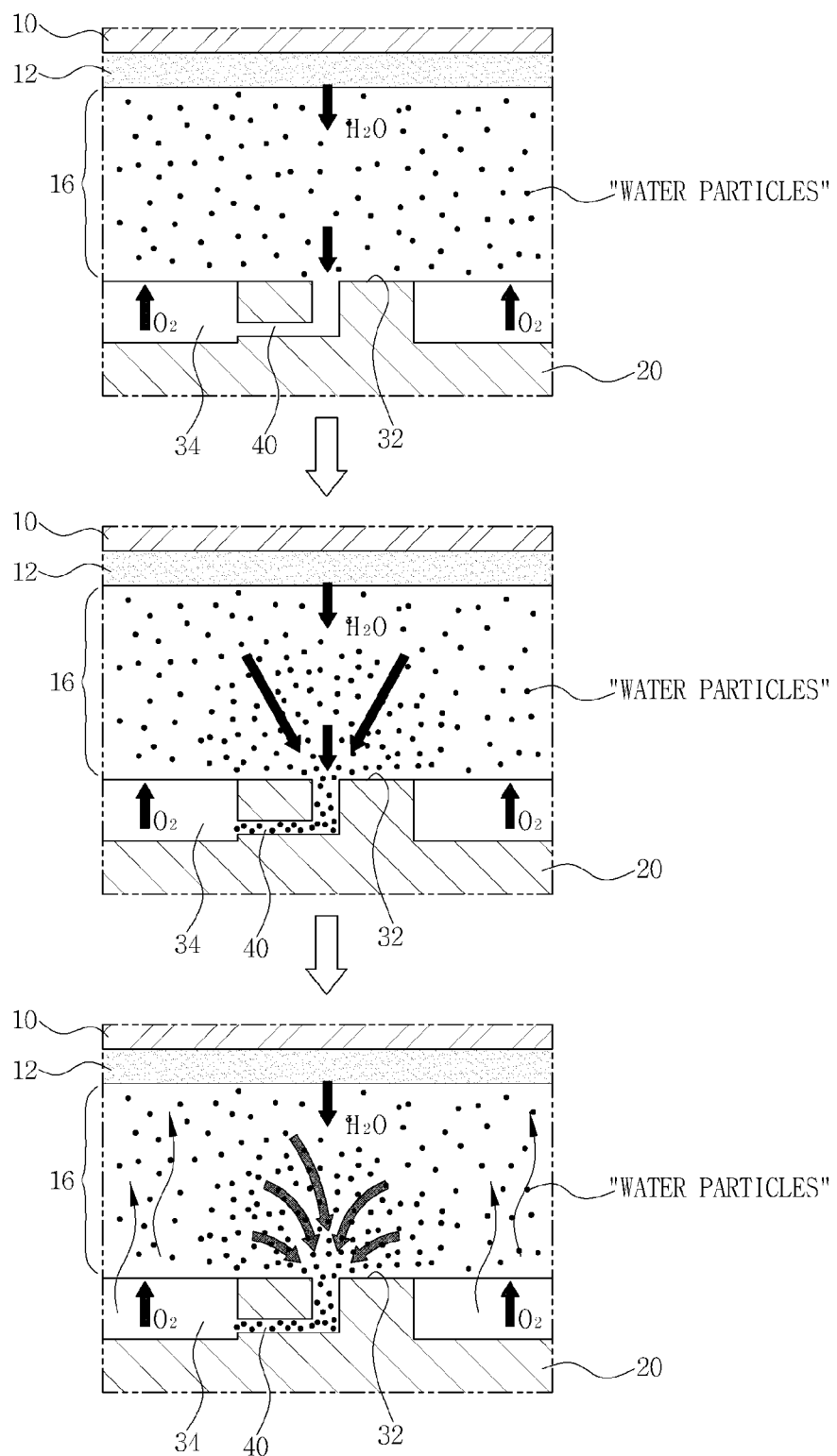
FIG. 5 is a cross-sectional view illustrating a water discharge hole having a perpendicular path formed on a separator for a fuel cell in accordance with the present invention and water discharge and air diffusion operations according thereto.
Figure 6:
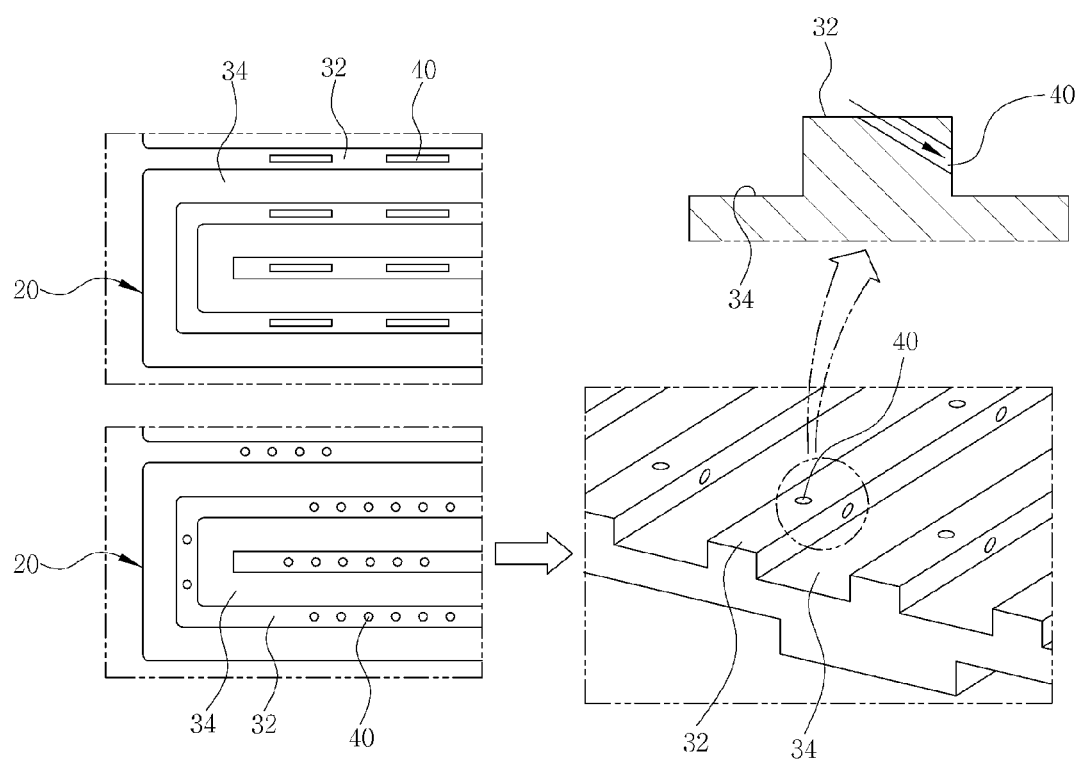
FIG. 6 is a plan view and a cross-sectional view illustrating a water discharge hole having an inclined path formed on a separator for a fuel cell in accordance with the present invention.

As described in one preferred embodiment of the invention, and as shown in FIG. 5, FIG. 5 is a cross-sectional view illustrating a water discharge hole preferably having a perpendicular path formed on a separator for a fuel cell in accordance with the present invention, and water discharge and air diffusion operations according thereto. According to further preferred embodiments, FIG. 6 is a plan view and a cross-sectional view illustrating a suitable water discharge hole having an inclined path formed on a separator for a fuel cell in accordance with other preferred embodiments of the present invention.

According to preferred embodiments of the invention as described herein, a fuel cell preferably comprises a polymer electrolyte membrane 10, catalyst layers including a cathode 12 and an anode 14, which are suitably coated on both sides of the electrolyte membrane 10 so that hydrogen reacts with oxygen, a gas diffusion layer (GDL) 16 stacked on the outside where the cathode 12 and the anode 14 are respectively positioned, and a separator 20 formed on the outside of the GDL 16 and including a plurality of flow fields (or channels), through which fuels are supplied and water generated by a reaction is preferably discharged.

Preferably, the separator 20 comprises a plurality of lands 32, which is a flat portion directly bonded to the GDL 16, and a plurality of flow fields 34 suitably formed between the lands 32, through which hydrogen or air passes.

The present invention has characteristic features in that the lands 32 are preferably in contact with and bonded to the GDL, and a plurality of water discharge holes 40 having a venturi effect as a water discharge means is suitably formed to penetrate through the flow fields 34 formed between the respective lands 32. The plurality of water discharge holes 40 preferably penetrates in a perpendicular path or an inclined path.

In preferred embodiments, a large amount of water generated by a reaction at the cathode 12 is suitably discharged from the GDL 16 to the flow fields 34 of the separator 20 through the water discharge holes 40.

Accordingly, the water from the GDL 16 is concentrated in the water discharge holes 40 of the lands 32 by the venturi effect of the water discharge holes 40 and, at the same time, easily discharged to the flow fields 34.

Further, in other preferred embodiments, although the air supplied to the flow fields 34 of the separator 20 is preferably diffused into the GDL 16, the flow of water discharged through the water discharge holes 40 does not collide with the flow of diffused air, and thus they do not suitably interfere with each other.

As a result, the water discharge efficiency is suitably improved by the water discharge holes 40 and, at the same time, since the air flow is not obstructed by the water discharge flow, the efficiency that the air is diffused into the GDL 16 is improved.

Figure 7:
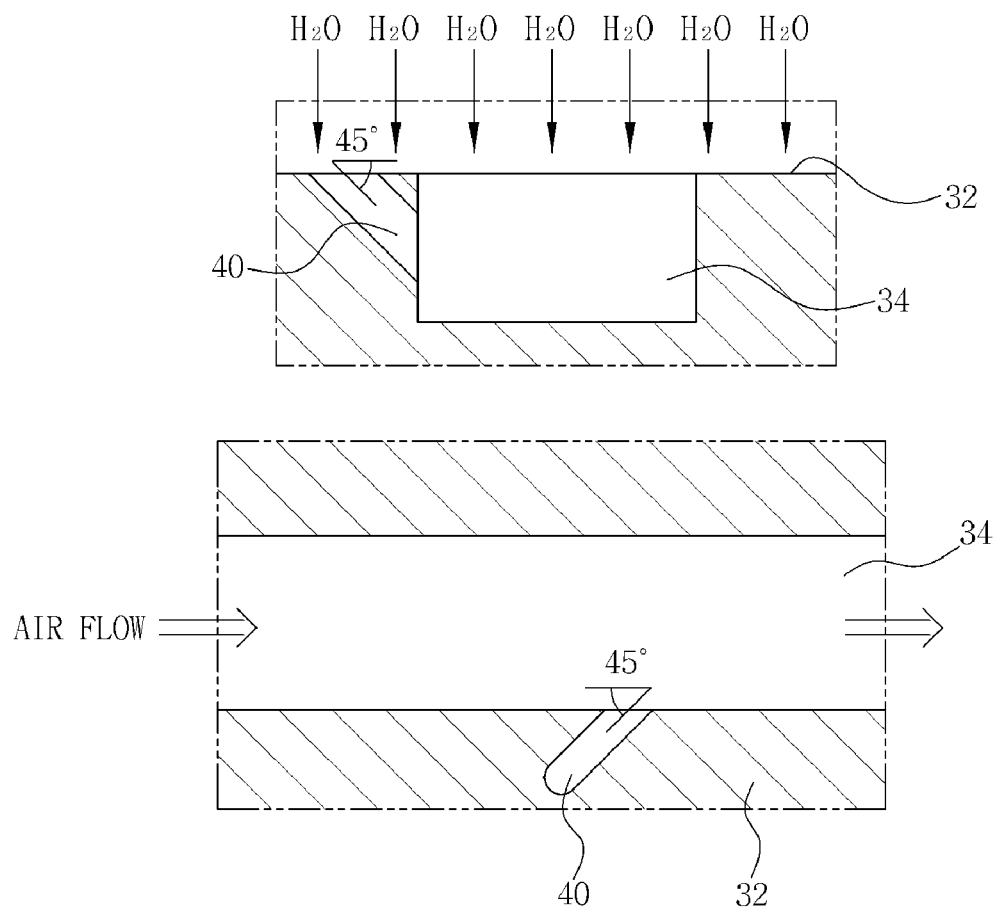
FIG. 7 is a schematic diagram illustrating an inclination angle of a water discharge hole formed on a separator for a fuel cell in accordance with the present invention.

FIG. 7 is a schematic diagram illustrating a preferred inclination angle of a water discharge hole formed on the separator for a fuel cell in accordance with certain preferred embodiments of the present invention.

As shown in FIG. 7, the water discharge hole 40 preferably penetrates through the flow field 34 from the land 32 being in contact with the GDL 16 at an inclination angle of about 45° with respect to the flow direction of the air supplied to the flow field 34 and the surface of the land 32, and it is thus possible to suitably prevent the air from flowing backward to the water discharge hole 40.

According to other further embodiments, a water discharge means in accordance with another embodiment of the present invention is described herein.

Figure 8:
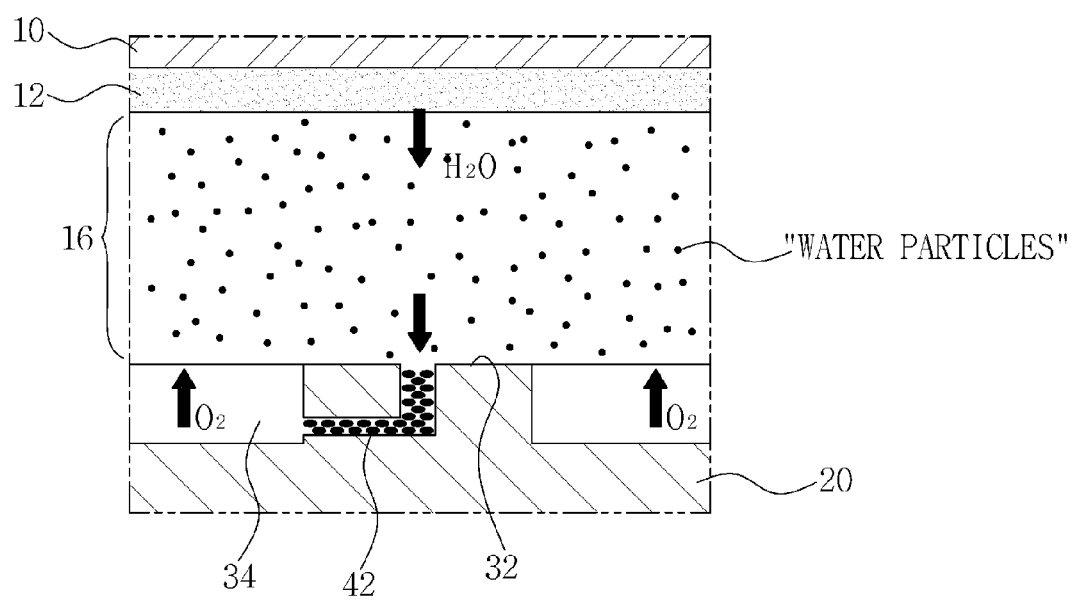
FIG. 8 is a cross sectional view illustrating a porous material for water discharge formed on a separator for a fuel cell in accordance with the present invention.

FIG. 8 is a cross sectional view illustrating a porous material for water discharge formed on a separator for a fuel cell in accordance with further preferred embodiments of the present invention.

According to further embodiments, the water discharge means in accordance with another embodiment of the present invention has certain characteristic features in that a plurality of lands 32 is in contact with and bonded to the GDL 16, a plurality of water discharge holes 40 is formed to penetrate through the flow fields 34 formed between the respective lands 32, and a porous material 42 having microporosity is filled in the water discharge holes 40 or the water discharge holes 40 have microporosity.

Accordingly, in other further embodiments, the water discharge is made at a slower rate through the porous material 42.

A water discharge means in accordance with further preferred embodiments of the present invention is described herein.

Figure 9:
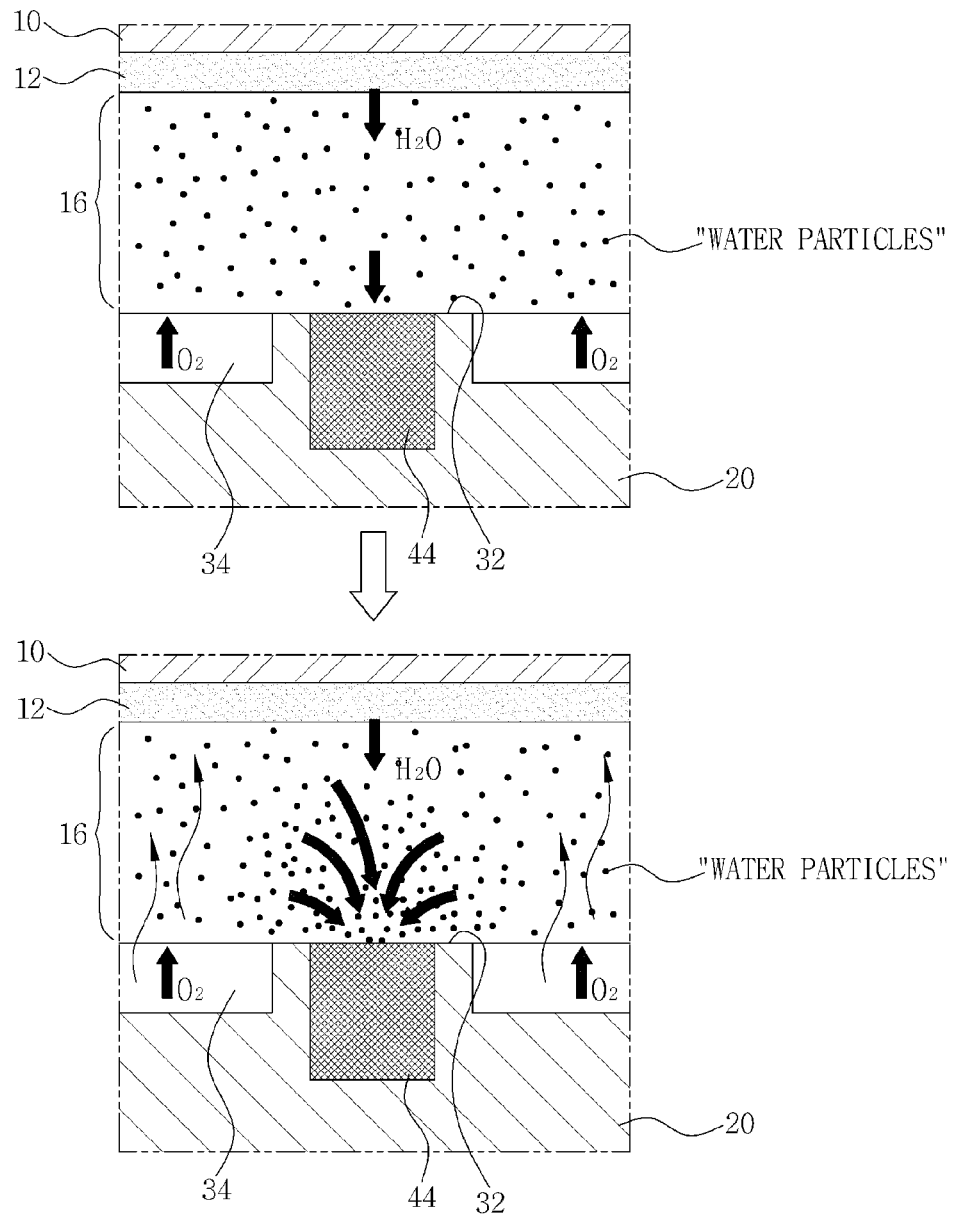
FIG. 9 is a cross sectional view illustrating a metal plate for water discharge formed on a separator for a fuel cell in accordance with the present invention.

FIG. 9 is a cross sectional view illustrating a metal plate for water discharge formed on a separator for a fuel cell in accordance with certain preferred embodiments of the present invention.

The water discharge means in accordance with still another embodiment of the present invention has characteristic feature in that a thermally conductive metal plate 44 capable of suitably condensing water from the GDL 16 is inserted into a land 32 from the surface thereof, instead of the water discharge hole between the land 32 and the flow field 34 of the separator 20.

Accordingly, when a large amount of water generated in the GDL 16 by a reaction at the cathode 12 is suitably in contact with the thermally conductive metal plate 44 of the land 32, the water is condensed, since the temperature of the thermally conductive metal plate 44 is relatively low.

As a result, the water in the GDL 16 is suitably condensed and collected in the thermally conductive metal plate 44, and the collected water can be slowly discharged from the land 32 along the wall surface of the flow field 34. According to still other preferred embodiments, since the water in the GDL 16 is condensed and collected in the metal plate 44 of the land 32, the air supplied to the flow field 34 of the separator 20 can be easily diffused into the GDL 16, not colliding with the water flow.

Next, a method of forming a water discharge hole on a metal separator in accordance with preferred embodiments of the present invention is described.

Figure 10A:
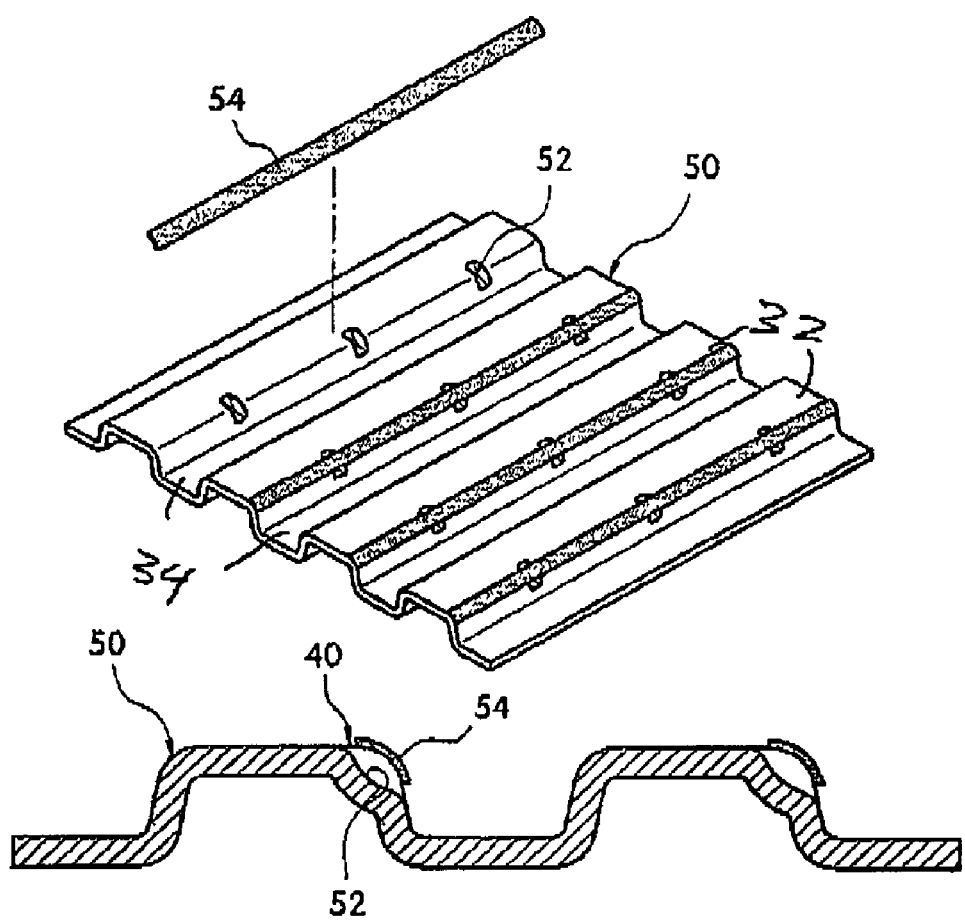
FIGS. 10A and 10B are schematic diagrams illustrating a method of forming a water discharge hole in a case where a separator for a fuel cell in accordance with the present invention is a metal separator.
Figure 10B:
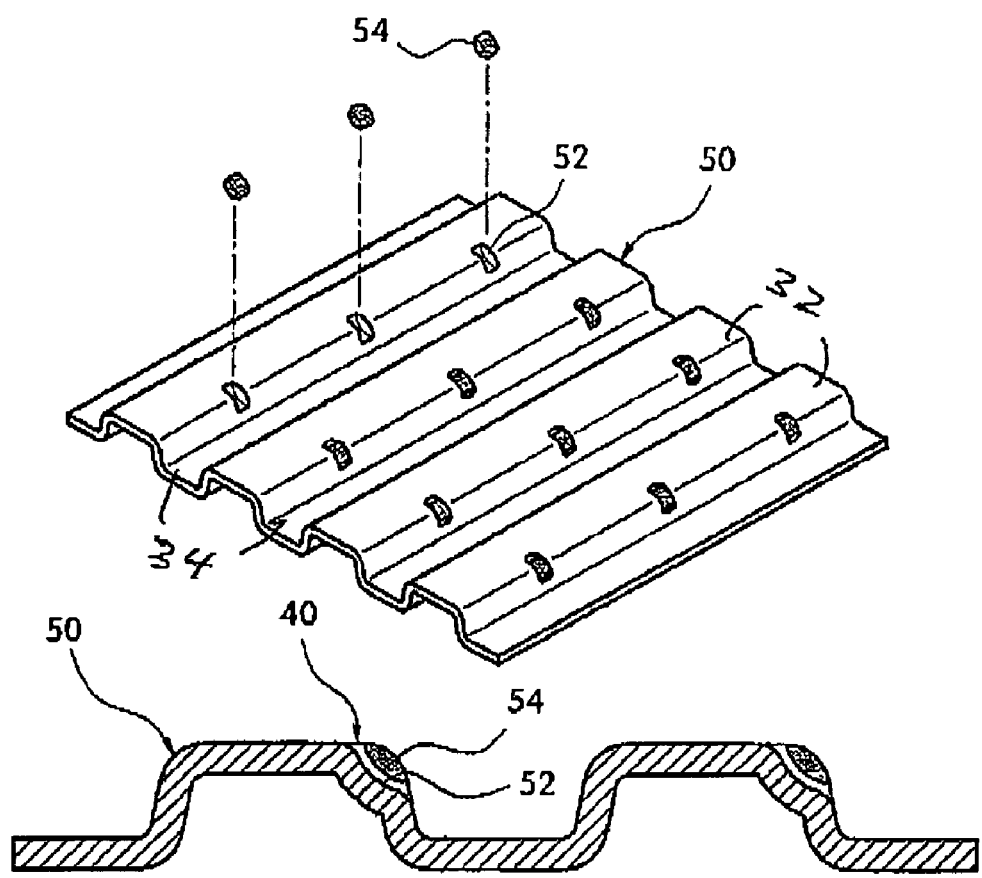

FIGS. 10A and 10B are schematic diagrams illustrating preferred methods of forming a water discharge hole preferably when a separator for a fuel cell in accordance with the present invention is a metal separator.

The metal separator 50 has a structure in which a plurality of lands 32 being in contact with and bonded to the GDL of the fuel cell and a plurality of flow fields 34 formed between the respective lands 32, through which hydrogen or air passes, have a concave convex shape. Preferably, the rear space of the land 32 is used as a coolant passage.

Generally, according to preferred embodiments of the invention, the metal separator 50 is formed by means of a press into a concave convex shape and, during the pressing process by the press, a plurality of grooves 52, which is to be connected with the flow fields 34, is suitably formed on the lands 32.

Preferably, when an opened portion of each of the thus processed grooves 52 is sealed with a sealing means 54, a water discharge hole 40 connecting the land 32 and the flow field 34 is preferably formed therein.

Accordingly, as shown in FIG. 10A, a tape may be used to seal the opened portions of the respective grooves 52 at a time and, as shown in FIG. 10B, a sealing material may be inserted into the opened portion of each of the grooves 52.

Accordingly, in further preferred embodiments, it is possible to adopt any sealing means for forming the water discharge hole 40 by sealing the opened portion of each of the grooves 52.

According to preferred embodiments of the present invention as described herein, a plurality of water discharge holes such as a venturi tube is preferably provided between a plurality of lands of the separator being in contact with and bonded to a gas diffusion layer (GDL) of a fuel cell and a plurality of flow fields formed between the respective lands, through which hydrogen or air suitably passes, so that water generated by a reaction is easily discharged from the GDL to the flow fields through the water discharge holes by a venturi effect.

Preferably, since the generated water is easily discharged from the lands to the flow fields along the water discharge holes in accordance with preferred embodiments of the present invention as described herein, the discharged water does not interfere with the flow of air supplied from the flow fields to the GDL, and it is thus possible to improve the efficiency that the air is diffused into the GDL.

Preferably, since the water discharge hole is suitably formed at an angle of 45° with respect to the flow direction of air supplied to the flow field, it is possible to prevent the air flow from flowing backward to the water discharge hole.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A separator for a fuel cell comprising:
 a plurality of lands being in contact with and bonded to a gas diffusion layer of a fuel cell; and
 a plurality of flow fields formed between the respective lands, through which hydrogen or air passes, wherein a plurality of water discharge means is formed between the lands and flow fields so that water is easily discharged from the gas diffusion layer to the flow fields,
 wherein the plurality of water discharge means comprises a plurality of water discharge holes having a venturi effect, formed to penetrate between the lands and the flow fields, wherein a porous material having micro porosity is filled in the plurality of water discharge holes.

2. The separator of claim 1, wherein the plurality of water discharge holes penetrates in a perpendicular path or an inclined path.

3. The separator of claim 1, wherein the plurality of water discharge holes having an inclined path is formed at an angle of 45° with respect to the flow direction of air supplied to the flow field and the surface of the land.

4. The separator of claim 1, wherein each of the water discharge means comprises a thermally conductive metal plate inserted into the land from the surface thereof.

5. A metal separator for a fuel cell comprising:
 a plurality of lands being in contact with and bonded to a gas diffusion layer of a fuel cell; and a plurality of flow fields formed between the respective lands, through which hydrogen or air passes, the lands and the flow fields having a concave convex shape,
 wherein a plurality of grooves connected to the flow fields is formed on the lands of the metal separator, and an opened portion of each of the grooves is sealed with a sealing means to form a water discharge hole connecting the land and the flow field.

* * * * *